(12) United States Patent
Chen et al.

(10) Patent No.: US 8,321,813 B2
(45) Date of Patent: Nov. 27, 2012

(54) POINTING DEVICE OPERATION MODIFICATION PROGRAM

(75) Inventors: Yen-Fu Chen, Austin, TX (US); Raymond Tang Wang, Austin, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 2956 days.

(21) Appl. No.: 10/703,021

(22) Filed: Nov. 6, 2003

(65) Prior Publication Data
US 2005/0102633 A1 May 12, 2005

(51) Int. Cl.
G06F 3/048 (2006.01)
(52) U.S. Cl. ...................................................... 715/856
(58) Field of Classification Search ................... 715/856
See application file for complete search history.

(56) References Cited

U.S. PATENT DOCUMENTS

| | | | |
|---|---|---|---|
| 5,276,797 A | 1/1994 | Bateman et al. | 395/161 |
| 5,530,796 A | 6/1996 | Wang | 395/156 |
| 5,581,670 A * | 12/1996 | Bier et al. | 715/856 |
| 5,594,847 A | 1/1997 | Moursund | 395/133 |
| 5,664,210 A | 9/1997 | Fleming et al. | 395/793 |
| 5,781,193 A | 7/1998 | Alimpich et al. | 345/352 |
| 5,828,376 A | 10/1998 | Solimene et al. | 395/352 |
| 5,867,162 A | 2/1999 | O'Leary et al. | 345/352 |
| 5,930,813 A | 7/1999 | Padgett et al. | 707/539 |
| 5,982,370 A | 11/1999 | Kamper | 345/356 |
| 6,160,555 A | 12/2000 | Kang et al. | 345/358 |
| 6,208,340 B1 | 3/2001 | Amin et al. | 345/339 |
| 6,240,430 B1 | 5/2001 | Deike et al. | 707/539 |
| 6,397,228 B1 | 5/2002 | Lamburt et al. | 707/203 |
| 6,434,568 B1 | 8/2002 | Bowman-Amuah | 707/103 |

OTHER PUBLICATIONS

Reviewguys, Mouse Tool(tm), Nov. 2, 1999, http://www.reviewguys.com/site/mouse-tool/.*
Designer Appliances Inc., Nib™, McNib™ Gestures Click-less software, 2005, (http://www.aerobicmouse.com/software-overview/nib/).*
Keer, "Mouse Tool", Reviewguys, Nov. 2, 1999 http://www.reviewguys.com/site/mouse-tool/.
China Patent Office action.

* cited by examiner

*Primary Examiner* — Andrey Belousov
(74) *Attorney, Agent, or Firm* — Yee & Associates, P.C.; Rudolf O. Siegesmund

(57) ABSTRACT

An apparatus and method for modifying and improving pointing device operation. The apparatus comprises a signal detector, a signal modifier, and a signal transmitter. The apparatus intercepts pointing device signals before application programs receive them. The signal detector continuously listens for signals generated by a pointing device, or a pointing device program. Responsive to the signal detector detecting a pointing device signal, the signal modifier determines what type of GUI element is located at the current pointer location. Based upon the identified GUI element, the signal modifier modifies the pointing device signal appropriately. The signal transmitter then relays the modified signal to any other programs that would have received the original signal if not for the action of the apparatus.

27 Claims, 2 Drawing Sheets

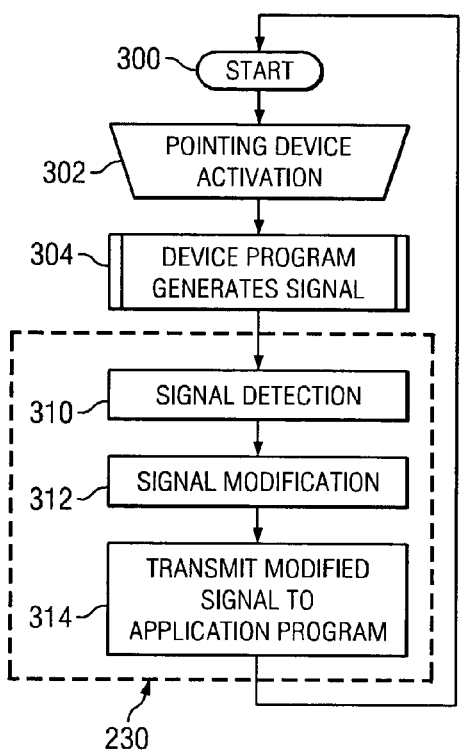
*FIG. 3*
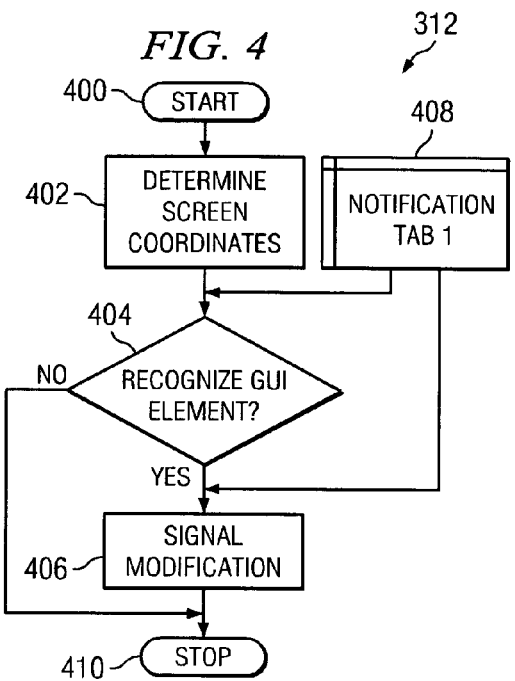
*FIG. 4*
*FIG. 5*
| GUI ELEMENT | FUNCTION | ACTION | TIME DELAY |
|---|---|---|---|
| BUTTON | ACTIVATE | P-R | 0.5 |
| TEXT | SELECT | P | 1.0 |
| SCROLL BAR | SCROLL | P | 0.5 |
| DROP MENU | ACTIVATE | P | 0.2 |
| LIST | SELECT | CONTROL-P | 0.5 |

POINTING DEVICE OPERATION MODIFICATION PROGRAM

FIELD OF THE INVENTION

The present invention relates to an apparatus for interacting with the graphical user interface of a computer, and more particularly to an improved method for using a pointing device to interact with a graphical user interface.

BACKGROUND OF THE INVENTION

Today, many computer users interact with a computer system through a graphical user interface. A graphical user interface (GUI) is a generic term for a collection of graphical elements displayed on a computer screen. To an end-user, the look and feel of different GUIs may be quite different, but almost all GUIs share some common elements. For instance, most GUIs use windows to organize the on-screen display. FIG. 1 is an illustration of a typical GUI window. Referring to FIG. 1 for illustration purposes, window 100 typically will have many common sub-elements, including menu interface 102. Other common window sub-elements include scroll bar 104 and scroll arrows 106, which allow a user to pan the information in the window up-and-down or side-to-side. Usually, windows also can be re-sized to meet a user's needs.

A GUI may be integrated into an operating system, or it may be separate system software subject to the operating system's control. In either case, though, software programmers generally create application software that uses the GUI provided by the operating system or system software. Although the implementation details can be quite complex, the conceptual interaction between an operating system GUI and an application program is not so complex. When an application program starts, it tells the operating system that it needs certain graphical elements. The most common element that a program will request is a new window within which to operate. The operating system responds to the application program by drawing a window and passing control to the application program. Usually, though, an application program tells the operating system that it needs more than just a simple window. An application program generally needs additional control elements that allow a user to control the window and the application program, such as a menu bar and scroll bars. The operating system is also responsible for drawing control elements when an application program needs them.

A pointing device, such as a mouse, is a hardware component commonly used for interacting with a computer system. A device program responsible for detecting and interpreting a pointing device's movement draws a pointer on the screen. The device program detects any movement of the mouse and moves the pointer on the screen accordingly. The device program also informs any application programs that the pointing device has been moved, and to where it has been moved. Similarly, if a user presses and releases a pointing device button, the device program relays this information to application programs that may be running. An application program must then determine how to respond to this information. By pointing, pressing, and releasing, a user can effectively interact with an application program through a pointing device. Common interactions include activating command buttons or menu commands, selecting text, and manipulating scroll bars.

The way in which a pointing device is used to interact with a GUI, though, has seen little change over time. The point, press, and release method has become a de facto standard. Many tasks accomplished with a pointing device are repeated frequently. Users would be able to save much time if common tasks, such as activating, selecting, scrolling, and sorting, could be simplified. A scroll wheel is an example of a prior art device that simplifies scrolling. A scroll wheel is typically a roller or wheel that protrudes from the top of a pointing device. When a user rotates the wheel, the device program sends a signal to an application program that in turn causes a window to scroll. Thus, a scroll wheel eliminates the need for pointing, pressing, and releasing to scroll. But not all pointing devices have scroll wheels. Furthermore, not all application programs understand and respond to the scroll wheel signal. And, of course, the scroll wheel has no effect on other common tasks. Therefore, a need still exists for an improved method of interacting with a GUI that simplifies many common tasks without relying on additional or different hardware.

SUMMARY OF THE INVENTION

The present invention, which meets the needs identified above, is an Operation Modification Program. The Operation Modification Program simplifies many common user tasks in a GUI environment by eliminating steps that a user would otherwise repeat many times. In particular, the invention eliminates the need for a user to press and release a pointing device button in order to accomplish common tasks. Instead, the invention allows a user to rely only on pointer movement to accomplish the same common tasks.

The Operation Modification Program (OPM) comprises a signal detector (SD), a signal modifier (SM), and a signal transmitter (ST). A pointing device generates signals whenever a user activates a pointing device. A pointing device program usually relays the pointing device signals to other application programs. An OPM, though, intercepts the pointing device signals before the application programs receive them. The SD continuously listens for signals generated by a pointing device, or a pointing device program. If the SD detects a pointing device signal, the SM determines what type of GUI element is located at the current pointer location. Based upon the identified GUI element, the SM modifies the pointing device signal appropriately. The ST then transmits the modified signal to any other programs that would have received the original signal, if not for the OPM action. For example, an OPM would eliminate the need for a user to press and release a pointing device button to activate a command button. Instead, a user would only be required to move the pointer over the command button. The OPM would recognize the placement over the command button and generate the press and release signals for the user. An OPM can be applied to many common tasks, including activating, selecting, scrolling, and sorting tasks. In an alternative embodiment, the Operation Modification Program would allow a user to customize the types of GUI elements recognized and the behavior applied to the recognized elements.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an illustration of the logic of the Operation Modification Program and its interaction with existing system components;

FIG. 4 is a detailed illustration of the signal modification step of 0; and FIG. 5 is an illustration of a modification table.

DETAILED DESCRIPTION OF THE PREFERRED EMBODIMENT

Figure 1:
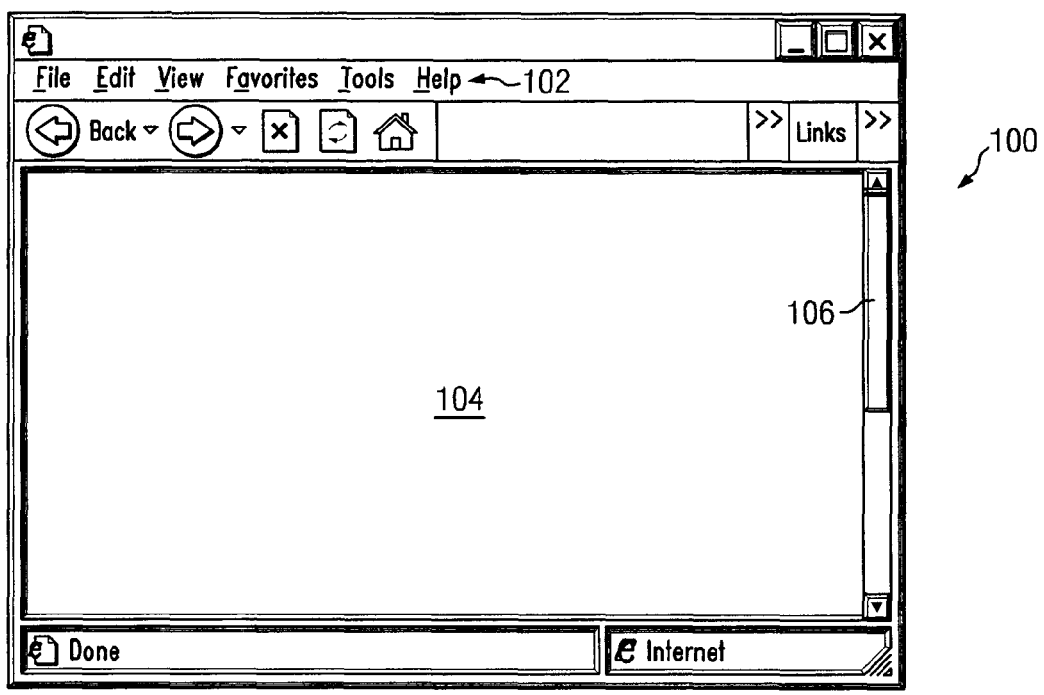
FIG. 1 is an illustration of a common graphical user interface window.

As used herein, the term "activate" means any action that causes a pointing device to generate a signal, including without limitation moving the device, pressing a device button, and releasing a device button.

The term "command button" means any graphic element in a display that may be activated and that upon activation causes the computer to perform an action.

The term "device button" refers to a physical button on a user input device.

The term "device program" means any computer program that provides support and control to a specific hardware component, such as a pointing device, thereby allowing other programs to use the specific hardware component.

The term "graphic element" or "GUI element" includes without limitation graphic characters, objects, and images.

The term "hardware" includes any physical equipment in a computer system, such as a central processing unit (CPU), input devices, and output devices.

The term "operating system" refers to any collection of computer programs that coordinate and control other computer system components, including hardware and application software.

The term "pointer" means any symbol rendered on a user output device used to point to GUI elements on the user output device.

The term "pointing device" means any user input device that can control a pointer, including without limitation a mouse, trackball, stylus, and touchpad.

The term "pointing device program" means any device program that operates on a pointing device.

The term "pointing device signal" means any signal generated by a pointing device, pointing device program, or any other apparatus or method designed to produce such signals.

The term "press signal" means any pointing device signal generated in response to a user pressing a button on a pointing device.

The term "release signal" means any pointing device signal generated in response to a user releasing a button on a pointing device.

The term "software" includes all the computer programs that cause a computer system to perform specific functions.

Computer systems comprise several distinct components. The number and type of components in a computer system can vary widely, but all components generally can be classified as either hardware or software.

Most software can be generally classified as either system software or application software. System software includes the operating system and device programs. A device program actually may be part of the operating system, or it may be a distinct component subject to control of the operating system. Application software, on the other hand, includes computer programs that users interact with to perform processing tasks. Examples of common application software include word processors and web browsers.

The present invention comprises an Operation Modification Program (OPM). An OPM operates in conjunction with many different computer system components including input components, system software, and application software. An OPM primarily interacts with a pointing device program (PDP) to alter the functions performed by the pointing device. The discussion below describes an OPM as independent system software, but a person of skill in the art will appreciate that the invention could be implemented in various ways. For example, an OPM could be integrated into an operating system or device program and still maintain the features and advantages described below. The foregoing and other objects, features, and advantages of the invention will be apparent from the following more particular description of the preferred embodiment of the invention, as illustrated in the accompanying drawings wherein like reference numbers represent like parts of the invention.

Figure 2:
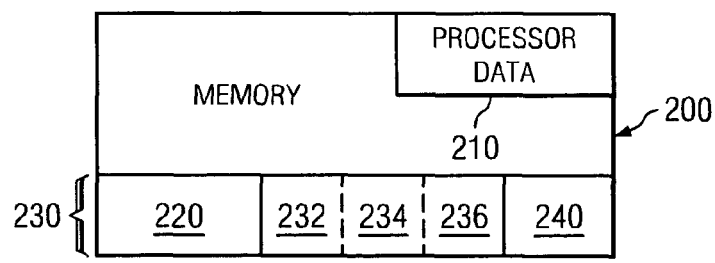
FIG. 2 is an illustration of computer memory containing the Operation Modification Program.

The internal configuration of a computer, including connection and orientation of the processor, memory, and input/output devices, is well known in the art. The present invention is a methodology that can be embodied in a computer program. Referring to FIG. 2, the methodology of the present invention is implemented in conjunction with PDP 220 and application program 240. The components of the present invention, OPM 230, comprise SD 232, SM 234, and ST 236, all of which reside in memory 200. Alternatively, OPM 230 can be stored in an external storage device such as a hard disk (not pictured) or a removable disk such as a CD-ROM (not pictured). Memory 200 is only illustrative of memory within a computer system and is not meant as a limitation. Memory 200 also contains processor data 210. The present invention may interface with processor data 210 through memory 200.

FIG. 3 provides a functional block diagram illustrating the operation of OPM 230. OPM 230 starts (300) as the operating system starts, or immediately thereafter. Whenever a user activates a pointing device (302) connected to the computer system, PDP 220 generates a signal (304) containing information about the activation. The information in the signal can vary, but at a minimum, the signal generally carries enough information so that other programs can determine the current screen coordinates of the pointer. SD 232 detects any signals generated by PDP 220 (310). Upon detection, SM 230 modifies the signal (312) and ST 236 transmits the modified signal to other application software (314) that might be waiting for PDP generated signals.

Referring to FIG. 4 for a more detailed view of step (312), SM 232 starts the modification process (400) by extracting the screen coordinates from PDP 220 generated signal (FIG. 2) (402). SM 232 then compares the GUI element at the indicated screen coordinates against a list of known GUI elements. OPM 230 can maintain the list of known GUI elements internally or the list could be incorporated into Modification Table 408. The preferred method is incorporation into Modification Table 408. Incorporating the list into Modification Table 408 allows easy expansion and customization of OPM 230. FIG. 5 provides an illustration of Modification Table 408. FIG. 5, is intended to be illustrative only, and not limiting the scope of the invention in any way. Persons with skill in the art will appreciate the many forms that Modification Table 408 could assume and these forms need not be described in detail herein. In FIG. 5 each column heading in the first row represents a typical field name that could be used in Modification Table 408. Each row in FIG. 5 represents a type of GUI element and the action that OPM 230 should take when a user moves the pointer over that type of GUI element. The last column in FIG. 5 represents the amount of time (in seconds) that a user would need to leave a pointer over the element before OPM 230 would act. For example, given Modification Table 408 in FIG. 5, when a user moves the pointer over a command button and leaves the pointer there for 0.5 seconds, SM 232 determines if command buttons are in Modification Table 408 (404). If "BUTTON" is not listed in Modification Table 408, SM 232 takes no further modification action (410) and continues as illustrated in FIG. 3. But since "BUTTON" is listed in Modification Table 408, SM 232 modifies PDP 220 generated signal (406) to include a press signal and a release signal (indicated by the "P-R" in the "Action" column), thereby activating the command button. Similarly, if, user moved the pointer over a scroll bar, SM 232 would generate a press signal after a 0.5-second delay. Thereafter, user, could move the scroll bar up-and-down without actually pressing and holding a device button. SM 232 generates a release signal whenever the user moves the pointer over white space or any other unmatched object for more than the specified delay time. SM 232 then stops (410) and continues as illustrated in FIG. 3.

Persons of skill in the art will appreciate that using Modification Table 408 allows the functionality of OPM 230 to be expanded merely by adding new types of GUI elements to the table. Similarly, persons of skill in the art will also appreciate that Modification Table 408 can be customized by a user in order to alter the behavior of OPM 230. For example, a user could easily change the "Action" value for a "TEXT" element to be "CTRL-P" instead of just "P." Most word processing application software would recognize a control-key signal with a press signal as a command to select an entire sentence instead of just one character at a time. Similarly, a user could easily change the "Time Delay" values to adjust for individual needs or work habits.

It will be understood from the foregoing that various modifications and changes may be made in the preferred embodiment of the present invention by those skilled in the art without departing from its true spirit. It is intended that this description and the examples provided are for illustrative purposes only and should not be construed in a limiting sense. The scope of the invention should be limited only by the language of the following claims.

What is claimed is:

1. A programmable apparatus for modifying pointing device use in a graphical user interface, comprising:
   a signal detector to detect pointing device signals;
   a signal modifier to modify pointing device signals, responsive to signals detected by the signal detector; and
   a signal transmitter to send pointing device signals to other programs;
   wherein responsive to detecting a signal from a pointing device, the signal detector determines a type of graphical user interface element located at a current pointer location, and based upon the type of graphical user interface element, modifies the pointing device signal in accordance with a user configuration for the type of graphical user interface element.

2. The apparatus of claim 1, wherein the pointing device signals are generated by a mouse.

3. The apparatus of claim 1, wherein the pointing device signals are generated by a trackball.

4. The apparatus of claim 1, wherein the pointing device signals are generated by a stylus.

5. The apparatus of claim 1, wherein the pointing device signals are generated by a touchpad.

6. The apparatus of claim 1, further comprising a modification table.

7. The apparatus of claim 1, wherein the signal modifier, responsive to a user moving a pointer over a command button, adds a press signal and a release signal.

8. The apparatus of claim 1, wherein the signal modifier, responsive to a user moving a pointer over a scroll bar, adds a press signal.

9. The apparatus of claim 1, wherein the signal modifier, responsive to a user moving a pointer over text, adds a press signal.

10. A computer readable memory for, causing a computer to modify pointing device use in a graphical user interface, comprising:
    a computer readable storage medium;
    a computer program stored in the storage medium, wherein the storage medium, so configured by the computer program, causes the computer to
    detect a signal from a pointing device;
    responsive to detecting the signal from the pointing device, determine a type of graphical user interface element located at a current pointer location, and based upon the type of graphical user interface element, modify the pointing device signal in accordance with a user configuration for the type of graphical user interface element; and
    send pointing device signals to other programs.

11. The computer readable memory of claim 10, wherein the pointing device signals are generated by a mouse.

12. The computer readable memory of claim 10, wherein the pointing device signals are generated by a trackball.

13. The computer readable memory of claim 10, wherein the pointing device signals are generated by a stylus.

14. The computer readable memory of claim 10, wherein the pointing device signals are generated by a touchpad.

15. The computer readable memory of claim 10 further comprising a modification table.

16. The computer readable memory of claim 10 wherein the computer causes, responsive to a user moving a pointer over a command button, a press signal and a release signal to be added to the pointing device signal.

17. The computer readable memory of claim 10 wherein the computer causes, responsive to a user moving a pointer over a scroll bar, a press signal to be added to the pointing device signal.

18. The computer readable memory of claim 10 wherein the computer causes, responsive to a user moving a pointer over text, a press signal to be added to the pointing device signal.

19. A method of modifying pointing device use in a graphical user interface, comprising: detecting pointing device signals, modifying detected pointing device signals, and transmitting pointing device signals to other programs; wherein responsive to detecting a signal from a pointing device, determining a type of graphical user interface element located at a current pointer location, and based upon the type of graphical user interface element, modifying the pointing device signal in accordance with a user configuration for the type of graphical user interface element.

20. The method of claim 19, wherein the pointing device signals are generated by a mouse.

21. The method of claim 19, wherein the pointing device signals are generated by a trackball.

22. The method of claim 19, wherein the pointing device signals are generated by a stylus.

23. The method of claim 19, wherein the pointing device signals are generated by a touchpad.

24. The method of claim 19, wherein a modification table is used to determine how pointing device signals are modified.

25. The method of claim 19, wherein a press signal and a release signal are added to the pointing device signal responsive to a user moving a pointer over a command button.

26. The apparatus of claim 19, wherein a press signal is added to the pointing device signal responsive to a user moving a pointer over a scroll bar, adds a press signal.

27. The apparatus of claim 19, wherein a press signal is added to the pointing device signal responsive to a user moving a pointer over text, adds a press signal.

* * * * *